(12) United States Patent
Fitzpatrick et al.

(10) Patent No.: US 8,612,893 B2
(45) Date of Patent: *Dec. 17, 2013

(54) DYNAMIC SCREENTIP LANGUAGE TRANSLATION

(71) Applicant: Microsoft Corporation, Redmond, WA (US)

(72) Inventors: Colin Fitzpatrick, Dublin (IE); John Patrick Whelan, Avoca (IE); Robert Patrick Doyle, Dublin (IE); John Gerard Lane, Dublin (IE); Barry McHugh, Dublin (IE); Terry Farrell, Mount Merrion (IE); Paul Barnes, Celbridge (IE); Andre Michael McQuaid, Dublin (IE); David Mowatt, Dalkey (IE)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,487

(22) Filed: Nov. 12, 2012

(65) Prior Publication Data

US 2013/0073955 A1    Mar. 21, 2013

Related U.S. Application Data

(63) Continuation of application No. 12/481,635, filed on Jun. 10, 2009, now Pat. No. 8,312,390.

(51) Int. Cl.
*G06F 13/00*    (2006.01)
*G06F 15/00*    (2006.01)

(52) U.S. Cl.
USPC ..................................... 715/856; 715/762

(58) Field of Classification Search
USPC ......... 715/700, 761, 763–765, 851–853, 740, 715/856, 762
See application file for complete search history.

(56) References Cited

U.S. PATENT DOCUMENTS

| 4,649,480 A | 3/1987 | Ohki et al. |
| 5,416,903 A | 5/1995 | Malcolm |

(Continued)

FOREIGN PATENT DOCUMENTS

| EP | 0955580 | 11/1999 |
| EP | 1049328 | 2/2000 |

(Continued)

OTHER PUBLICATIONS

U.S. Official Action dated Mar. 18, 2008 in U.S. Appl. No. 11/002,773.

(Continued)

*Primary Examiner* — Cao "Kevin" Nguyen
(74) *Attorney, Agent, or Firm* — Hope Baldauff, LLC

(57) ABSTRACT

When a user interface cursor hovers over a user interface item, a determination is made as to whether the user interface item has an associated screentip. If the user interface item has an associated screentip, text associated with the screentip is identified, a translated text string is located for the text string, and the translated text string is displayed in the screentip. If the user interface item does not have an associated screentip, a determination is made as to whether the user interface item contains a text string. If so, a determination is made as to whether a translated text string is available that corresponds to the text in the user interface item. If so, the translated text string is displayed in a screentip for the user interface item.

20 Claims, 10 Drawing Sheets

(56) References Cited

U.S. PATENT DOCUMENTS

| | | | |
|---|---|---|---|
| 5,450,538 | A | 9/1995 | Glaser et al. |
| 5,583,761 | A | 12/1996 | Chou |
| 5,664,206 | A | 9/1997 | Murow et al. |
| 5,671,378 | A | 9/1997 | Acker et al. |
| 5,835,912 | A | 11/1998 | Pet |
| 5,872,973 | A | 2/1999 | Mitchell et al. |
| 5,886,694 | A | 3/1999 | Breinberg et al. |
| 5,900,871 | A | 5/1999 | Atkin et al. |
| 6,025,836 | A | 2/2000 | McBride |
| 6,035,121 | A | 3/2000 | Chiu et al. |
| 6,041,180 | A | 3/2000 | Perks et al. |
| 6,093,215 | A | 7/2000 | Buxton et al. |
| 6,151,022 | A | 11/2000 | Alshibani et al. |
| 6,195,794 | B1 | 2/2001 | Buxton et al. |
| 6,223,339 | B1 | 4/2001 | Shah et al. |
| 6,275,790 | B1 | 8/2001 | Yamamoto et al. |
| 6,275,978 | B1 | 8/2001 | Bell |
| 6,339,755 | B1 | 1/2002 | Hetherington et al. |
| 6,392,673 | B1 | 5/2002 | Andrew et al. |
| 6,467,085 | B2 | 10/2002 | Larsson |
| 6,469,713 | B2 | 10/2002 | Hetherington et al. |
| 6,490,547 | B1 | 12/2002 | Atkin et al. |
| 6,496,793 | B1 | 12/2002 | Veditz et al. |
| 6,513,025 | B1 | 1/2003 | Rosen |
| 6,530,039 | B1 | 3/2003 | Yang |
| 6,557,165 | B1 | 4/2003 | Nagashima et al. |
| 6,559,861 | B1 | 5/2003 | Kennelly |
| 6,658,644 | B1 | 12/2003 | Bishop et al. |
| 6,662,355 | B1 | 12/2003 | Caswell et al. |
| 6,691,298 | B1 | 2/2004 | Russo et al. |
| 6,718,549 | B1 | 4/2004 | Narin et al. |
| 6,744,450 | B1 | 6/2004 | Zimniewicz et al. |
| 6,766,348 | B1 | 7/2004 | Combs et al. |
| 6,820,267 | B2 | 11/2004 | Christensen et al. |
| 6,859,820 | B1 | 2/2005 | Hauduc et al. |
| 6,877,154 | B2 | 4/2005 | Nagashima et al. |
| 6,931,628 | B2 | 8/2005 | McGeorge, Jr. |
| 6,950,993 | B2 | 9/2005 | Breinberg |
| 6,968,438 | B1 | 11/2005 | Russo et al. |
| 7,017,143 | B1 | 3/2006 | Andrew et al. |
| 7,111,282 | B2 | 9/2006 | Stephenson |
| 7,152,222 | B2 | 12/2006 | Kumhyr et al. |
| 7,222,343 | B2 | 5/2007 | Heyrman et al. |
| 7,225,222 | B1 | 5/2007 | Lu |
| 7,228,541 | B2 | 6/2007 | Gupton et al. |
| 7,234,110 | B2 | 6/2007 | Sumitomo |
| 7,318,020 | B1 | 1/2008 | Kim |
| 7,324,993 | B2 | 1/2008 | Real et al. |
| 7,337,079 | B2 | 2/2008 | Park et al. |
| 7,437,704 | B2 | 10/2008 | Dahne-Steuber et al. |
| 7,617,092 | B2 | 11/2009 | McHugh et al. |
| 7,752,266 | B2 | 7/2010 | Grove |
| 2001/0032218 | A1 | 10/2001 | Huang |
| 2002/0120762 | A1 | 8/2002 | Cheng et al. |
| 2003/0025737 | A1 | 2/2003 | Breinberg |
| 2003/0040899 | A1* | 2/2003 | Ogilvie ............... 704/2 |
| 2003/0101043 | A1 | 5/2003 | Boegelund et al. |
| 2003/0115552 | A1 | 6/2003 | Jahnke et al. |
| 2003/0126559 | A1 | 7/2003 | Fuhrmann |
| 2003/0135358 | A1 | 7/2003 | Lissauer et al. |
| 2004/0122652 | A1 | 6/2004 | Andrews et al. |
| 2004/0167784 | A1 | 8/2004 | Travieso et al. |
| 2004/0230416 | A1 | 11/2004 | Ye et al. |
| 2004/0268311 | A1 | 12/2004 | Pizzoli et al. |
| 2005/0050526 | A1 | 3/2005 | Dahne-Steuber et al. |
| 2005/0066315 | A1 | 3/2005 | Nguyen et al. |
| 2005/0102253 | A1 | 5/2005 | Wu et al. |
| 2005/0188383 | A1 | 8/2005 | Alcazar et al. |
| 2006/0059424 | A1 | 3/2006 | Petri et al. |
| 2006/0080082 | A1 | 4/2006 | Ravindra et al. |
| 2006/0116864 | A1 | 6/2006 | McHugh et al. |
| 2006/0117304 | A1 | 6/2006 | Anastassopoulos et al. |
| 2006/0130026 | A1 | 6/2006 | McHugh et al. |
| 2006/0130031 | A1 | 6/2006 | McHugh et al. |
| 2006/0130032 | A1 | 6/2006 | McHugh et al. |
| 2006/0150173 | A1 | 7/2006 | McHugh et al. |
| 2006/0156278 | A1 | 7/2006 | Reager |
| 2006/0206797 | A1 | 9/2006 | Kohlmeier et al. |
| 2007/0050757 | A1 | 3/2007 | van Woerkom et al. |
| 2007/0150258 | A1 | 6/2007 | Lister et al. |
| 2007/0226687 | A1 | 9/2007 | Fallen-Bailey et al. |
| 2007/0244691 | A1* | 10/2007 | Alwan et al. ............... 704/8 |
| 2008/0077384 | A1 | 3/2008 | Agapi et al. |
| 2008/0082317 | A1* | 4/2008 | Rosart et al. ............... 704/8 |
| 2008/0222165 | A9 | 9/2008 | Friedman et al. |
| 2009/0094609 | A1 | 4/2009 | Burukhin et al. |

FOREIGN PATENT DOCUMENTS

| | | |
|---|---|---|
| EP | 1071013 | 1/2001 |
| EP | 1857928 | 11/2007 |
| WO | WO 00/45249 | 8/2000 |
| WO | WO 2007/149152 | 12/2007 |

OTHER PUBLICATIONS

U.S. Official Action dated Oct. 30, 2008 U.S. Appl. No. 11/002,773.

U.S. Notice of Allowance dated Jun. 26, 2009 in U.S. Appl. No. 11/002,773.

U.S. Official Action dated Nov. 28, 2007 in U.S. Appl. No. 11/040,330.

U.S. Official Action dated Jun. 5, 2008 in U.S. Appl. No. 11/040,330.

U.S. Official Action dated Aug. 22, 2007 in U.S. Appl. No. 11/040,331.

U.S. Official Action dated Feb. 5, 2008 in U.S. Appl. No. 11/040,331.

U.S. Official Action dated Oct. 27, 2008 in U.S. Appl. No. 11/040,331.

U.S. Notice of Allowance dated Feb. 17, 2009 in U.S. Appl. No. 11/040,331.

U.S. Official Action dated Feb. 21, 2008 in U.S. Appl. No. 11/042,470.

U.S. Official Action dated Sep. 24, 2008 in U.S. Appl. No. 11/042,470.

U.S. Official Action dated Mar. 30, 2009 in U.S. Appl. No. 11/042,470.

U.S. Official Action dated Jun. 9, 2009 in U.S. Appl. No. 11/042,470.

U.S. Official Action dated Dec. 9, 2009 in U.S. Appl. No. 11/042,470.

U.S. Official Action dated May 12, 2010 in U.S. Appl. No. 11/042,470.

U.S. Official Action dated Nov. 22, 2010 in U.S. Appl. No. 11/042,470.

U.S. Official Action dated May 4, 2011 in U.S. Appl. No. 11/042,470.

U.S. Official Action dated Oct. 27, 2011 in U.S. Appl. No. 11/042,470.

U.S. Official Action dated Sep. 25, 2007 in U.S. Appl. No. 11/042,806.

U.S. Official Action dated Apr. 14, 2008 in U.S. Appl. No. 11/042,806.

U.S. Official Action dated Dec. 24, 2008 in U.S. Appl. No. 11/042,806.

U.S. Official Action dated Jun. 10, 2009 in U.S. Appl. No. 11/042,806.

U.S. Notice of Allowance dated Feb. 5, 2010 in U.S. Appl. No. 11/042,806.

Keniston, Kenneth "Software Localization: Notes on Technology and Culture," Jan. 17, 1997, retrieved from http://webmit.edu/kken/Public/Papers.htm, 23 pp.

"Building International Applications: Release 2," 1995, Forte Software, Inc., 64 pp.

"Forte Programming Guide, Release 3 of the Forte Application Environment," 1998, Forte, Software, Inc., Chapter 15., 54 pp.

Symmonds, Nick. *Internationalization and Localization Using Microsoft .NET.* Jan. 2002, Apress, Springer-Verlag, New York, Chapters 2-3, 7, 9-11. 214 pp.

(56) References Cited

OTHER PUBLICATIONS

Uren, Emmanuel, "Annotated Bibliography of Internationalization and Localization," Feb. 1997, ACM SIGDOC Asterisk Journal of Computer Documentation, 21(1): 26-33.

Hunt et al. "Detours: Binary Interception of Win32 Functions," Jul. 1999. Proceedings of the 3rd USENIX Windows NT Symposium, Seattle, Washington, 9 pp.

"Vectored Exception Handling in Windows Server 2003," http://www.devx.com/SUmmitDays/Article/15992/1411/pdo/B9440BEA0C53FEBCB807C22A051841D, 2 pp.

Keogh, CP, "Sizing of Textual Elements for National Language Support," Aug. 1, 1994, IBM Technical Disclosure Bulletin, vol. 37, No. 8, p. 169. Abstract only.

European Search Report dated May 15, 2007 in European Application No. 06270050.5.

"Talk:Bityi (Translating Code Editor)," Retrieved Apr. 16, 2009 at<<http://wiki.laptop.org/go/Talk:Source-code_editor_with_transparent_native-language_display>>, "OLPC", 8 Pages.

"Translation Memory," Retrieved Apr. 16, 2009 at<<http://www.sdl.com/en/products/translation-memory/>>, 1 Page.

Kumhyr David, "Tivoli's Multilingual Support," Aug./Sep. 1999, 15th International Unicode Conference 2 San Jose, CA, Retrieved from ftp://ftp.software.ibm.com/software/globalization/documents/Tivoli-MultiLanguage.pdf, 26 pp.

"CRM 4.0 Tooltip Wizard," Dec. 19, 2008, retrieved from http://mscrm4ever.blogspot.com/2008/12/crm-40-tooltip-wizard.html, 8 pp.

U.S. Official Action dated Feb. 7, 2012 in U.S. Appl. No. 12/481,635.

U.S. Notice of Allowance dated Jul. 12, 2012 in U.S. Appl. No. 12/481,635.

\* cited by examiner

DYNAMIC SCREENTIP LANGUAGE TRANSLATION

CROSS REFERENCE TO RELATED APPLICATIONS

This application is a continuation of co-pending U.S. application Ser. No. 12/481,635 entitled "Dynamic Screentip Language Translation," filed Jun. 10, 2009, now U.S. Pat. No. 8,312,390, which is incorporated herein by reference.

BACKGROUND

Application programs are often provided in different versions that are localized for different languages. For instance, an office application suite might be provided in different versions localized for English, Chinese, and other languages. While localized application programs are often provided in this manner, application programs typically do not support temporary translation of their user interface into other languages.

Temporary translation of an application program user interface might be desirable, for instance, to an English-speaking auditor that has traveled to China to audit some spreadsheet documents. If the only available version of the spreadsheet application program for editing the documents is a Chinese language version, then the auditor might not be able to navigate the features of the application because he or she does not understand the language. In this situation, the auditor might have to purchase and install an English language version of the spreadsheet application.

Some users might also be required to utilize an application program in a language dictated by someone else. For instance, an employer might only purchase application programs in one language. Multi-lingual users that do not easily understand the work language dictated by their employer might have difficulty utilizing the application programs.

In another scenario, an application program might not be available in a version localized to a particular language. For instance, if a word processing application program is not available in a version that has been localized for Lithuania, users in that country might instead utilize an English or Russian language version. These users might, however, have difficulty in utilizing an application program that has not been localized for their native language.

It is with respect to these and other considerations that the disclosure presented herein has been made.

SUMMARY

Concepts and technologies are described herein for dynamic screentip language translation. According to embodiments presented herein, aspects of a user interface provided by an application program can be temporarily and dynamically translated from a source language to a specified target language. For instance, text shown in a screentip associated with a user interface item could be dynamically translated from Chinese to English at runtime. A screentip is text that is displayed temporarily while a user interface cursor is hovering over a user interface item, such as an icon or button. The term screentip as utilized herein encompasses tooltips and supertips. Supertips are screentips that can include multiple text strings and graphics. A screentip containing translated text can also be dynamically generated for a user interface item that includes text but that does not otherwise have an associated screentip. Through the use of this mechanism, a user can temporarily view translated text regarding user interface items provided by an application without the need to purchase a version of the application localized for another language.

According to one embodiment, translated user interface text strings are provided by displaying a screentip on a display screen of a computer. Hovering refers to a process of placing a user interface cursor over a user interface item without performing a selection action, such as a mouse click. When the user interface cursor is moved away from the user interface item, the display of the screentip is removed from the display screen.

According to other aspects of the embodiments presented herein, a determination is made as to whether a user interface cursor is hovering over a user interface item. If so, a determination is made as to whether the user interface item has an associated screentip. If the user interface item has an associated screentip, text associated with the screentip is identified, a translated text string is located for the text string, and the translated text string is displayed in the screentip. If the user interface item does not have an associated screentip, a determination is made as to whether the user interface item contains a text string. If so, a determination is made as to whether a translated text string is available that corresponds to the text in the user interface item. If so, the translated text string is displayed in a newly generated screentip for the user interface item.

According to another aspect, a translated text string may be located for a given text string by performing a hash operation on the text string to generate a hash value. The hash value is then utilized as an index into a first file, referred to herein as a source language index file, to locate a unique identifier for the text string. The unique identifier is then utilized as an index into a second file, referred to herein as a target language string file, to locate the translated text string. Source language index files and target language string files can be provided per application or parts of an application and per language. In one embodiment, the application that generated a text string is identified and only the source language index file and the target language string file for that application and the desired source and target languages are loaded into the main memory of a computer system.

According to another aspect, multiple unique identifiers may be located in the source language index file for a given text string. In this case, runtime metadata and metadata stored in the source language index file can be utilized to select the unique identifier to be utilized as the index into the target language string file. This may be helpful, for instance, when a single text string has multiple translated text strings.

According to another aspect, a text string, referred to herein as a compound text string, is formed from two or more text strings, referred to herein as component text strings. A cache is maintained when compound text strings are displayed that identifies the compound text string and its component text strings. In order to provide a translation of a compound text string, the compound text string and its component text strings are located in the cache. For each of the component text strings, a hash value is generated, the hash value is utilized to locate a unique identifier for the component text string in the source language index file, and the unique identifier is utilized to locate the translated text string in the target language string file. The translated text strings for each of the component strings are then concatenated to form a translated text string for the compound text string that can be displayed in a screentip. In one implementation, the cache is stored on disk for use in distribution to other users or to the manufacturer of the application.

According to another aspect, a timer is utilized to trigger a periodic determination as to whether a translation should be performed. If modality is detected in an application program, such as when a modal dialog box is being displayed, the duration of the timer is reduced. When the modality ceases, such as when the dialog box is dismissed, the timer is restored to its original duration.

It should be appreciated that the above-described subject matter may also be implemented as a computer-controlled apparatus, a computer process, a computing system, as an article of manufacture such as a computer readable storage medium, or in another manner. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
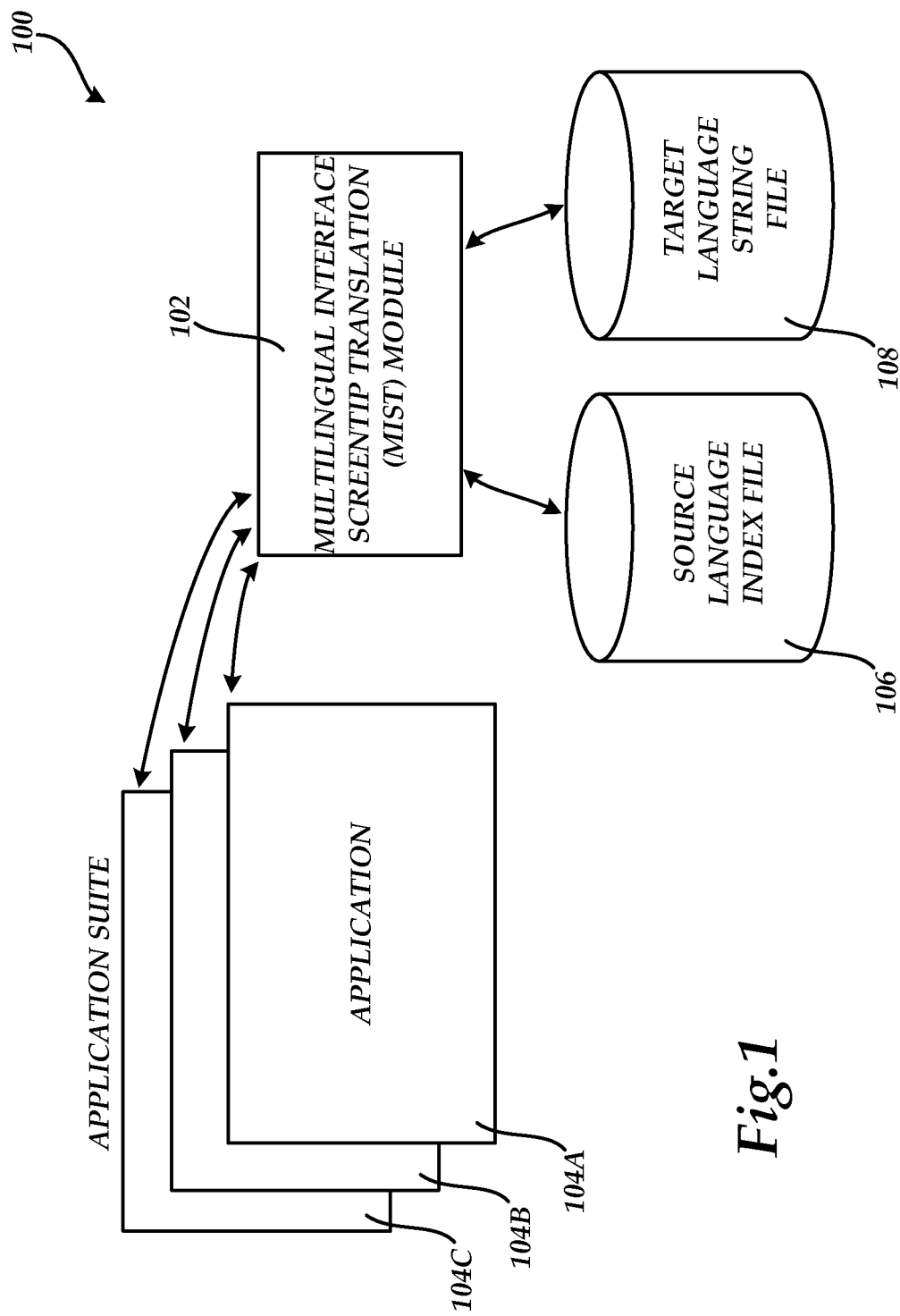
FIG. 1 is a software architecture diagram showing aspects of a software architecture that might be utilized to embody aspects of the embodiments presented herein.

The following detailed description is directed to technologies for dynamic screentip language translation. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, concepts and technologies for dynamic screentip language translation will be described.

Turning now to FIG. 1, aspects of a system 100 for dynamic screentip language translation will be provided. As illustrated in FIG. 1, the embodiments presented herein provide a multilingual interface screentip translation ("MIST") module 102 that is configured to interoperate with one or more applications 104A-104C to provide the functionality presented herein. It should be appreciated that the applications 104A-104C may be stand-alone application programs or may be bundled together as part of an application program suite. Moreover, it should also be appreciated that although the functionality presented herein is described as being performed by the MIST module 102, this functionality may also be integrated directly within the applications 104A-104C, within an operating system, or within another type of program module.

As will be described in greater detail below, the MIST module 102 is configured in embodiments to dynamically translate aspects of a user interface provided by the applications 104A-104C from a source language to a specified target language. For instance, as mentioned above, text shown by the applications 104A-104C in Chinese could be dynamically translated by the MIST module 102 to English at runtime.

In one particular embodiment, the MIST module 102 is configured to determine whether a user interface cursor, such as a mouse cursor, is hovering over a user interface item displayed by one of the applications 104A-104C. If so, the MIST module 102 is further configured to determine whether the user interface item has an associated screentip. As discussed briefly above, a screentip is text that is displayed temporarily while a user interface cursor is hovering over a user interface item, such as an icon or button. As utilized herein, the term hovering refers to a process of placing a user interface cursor over a user interface item without performing a selection action, such as a mouse click. When the user interface cursor is moved away from the user interface item, the display of the screentip is removed from the display screen. It should be appreciated that the term screentip as utilized herein encompasses tooltips and supertips. Supertips are screentips that can include multiple text strings and graphics.

If the MIST module 102 determines that a user interface cursor is hovering over a user interface item and that the item has an associated screentip, the MIST module 102 is configured to identify the text associated with the screentip, locate a translated text string for the text string in the screentip, and to display the located translated text string in the screentip. If the MIST module 102 determines that the user interface item does not have an associated screentip, the MIST module 102 will determine whether the user interface item contains a text string. If the MIST module 102 determines that the user interface item contains a text string, the MIST module 102 will attempt to locate a translated text string for the text string in the user interface item and display the translated text string in a screentip for the user interface item. Additional details regarding these processes and others performed by the MIST module 102 will be described in greater detail below with respect to FIGS. 2-9.

As also illustrated in FIG. 1, the MIST module 102 is configured to utilize several resources during the process of locating translated text strings. In particular, the MIST module 102 operates in conjunction with a source language index file 106 and a target language string file 108. As will be described in greater detail below with respect to FIG. 4, the source language index file 106 provides a mapping between hash values and unique identifiers associated with each string displayed by the applications 104A-104C. The target language string file 108 maps the unique identifiers to the corresponding translated text strings.

It should be appreciated that, according to embodiments, the source language index file 106 and the target language string file 108 may be provided on a per language and per application basis. For instance, a separate source language index file 106 may be provided for each of the applications 104A-104C in each language supported by the applications 104A-104C. As will be described in greater detail below, the version of the source language index file 106 for each application 104A-104C contains information for the strings displayed by the particular applications 104A-104C. This allows the size of the source language index file 106 to be kept to a minimum while still allowing the text strings displayed by each of the applications 104A-104C to be dynamically translated at runtime. Similarly, different versions of the target language string file 108 may be provided for each of the applications 104A-104C for each of the target languages to which text strings displayed by the applications 104A-104C may be translated. This allows the target language string file 108 to also be kept to a minimum size while still supporting the translation of many of the strings displayed by each of the applications 104A-104C at runtime. Additional details regarding the structure and usage of the source language index file 106 and the target language string file 108 will be provided below with respect to FIG. 4.

Figure 2A:
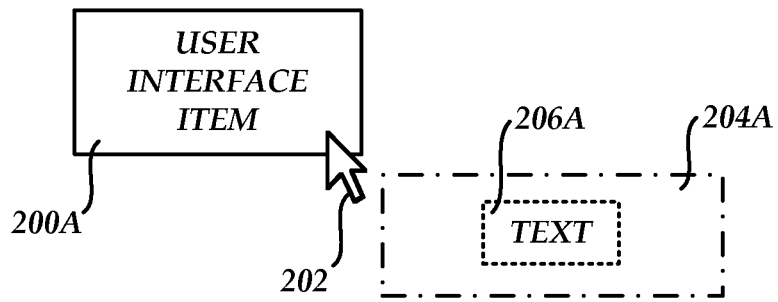
FIGS. 2A-2C are user interface diagrams showing several illustrative user interfaces provided by embodiments presented herein.

Turning now to FIG. 2A, additional details regarding the functionality of the applications 104A-104C for generating a screentip will be described. As discussed briefly above, the applications 104A-104C are configured to display user interface items, such as icons, buttons, and other types of user interface controls. FIG. 2A illustrates one such user interface item 200A that might be provided by one of the applications 104A-104C (also referred to herein individually as an application 104). As also described briefly above, the applications 104A-104C might also be configured to determine whether a user interface cursor 202, is hovering over the user interface item 200A. In response to determining that the user interface cursor 202 is hovering over the user interface item 200A, an application 104 might display a screentip 204A. As discussed briefly above, a screentip includes text that is displayed temporarily while the user interface cursor is hovering over the user interface item. In the example shown in FIG. 2A, the screentip 204A includes text 206A. Certain types of screentips, such as supertips, might also include additional text or graphics. As also discussed briefly above, when the user interface cursor is moved away from the user interface item 200A, the display of the screentip 204A is removed.

Figure 2B:
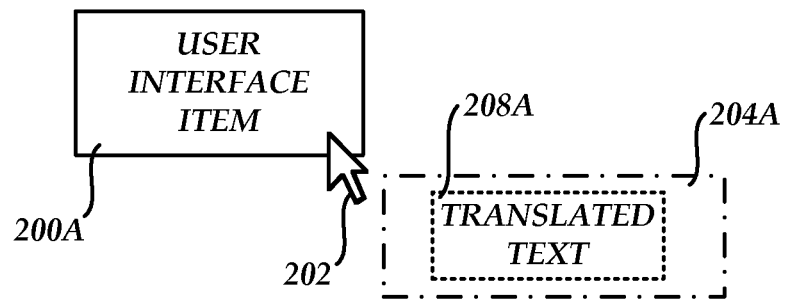

According to aspects presented herein, the MIST module 102 is configured to provide functionality for translating the text 206A of a screentip 204A to a specified target language. In this regard, the MIST module 102 is configured to determine whether a user interface item 200A over which a user interface cursor 202 is hovering has an associated screentip 204A. If so, the MIST module 102 is configured to identify translated text 208A for the text 206A that would ordinarily be displayed in the screentip 204A. If translated text 208A is located, the MIST module 102 is configured to cause the translated text 208A to be displayed in the screentip 204A in place of the text 206A. This is illustrated in FIG. 2B.

Figure 2C:
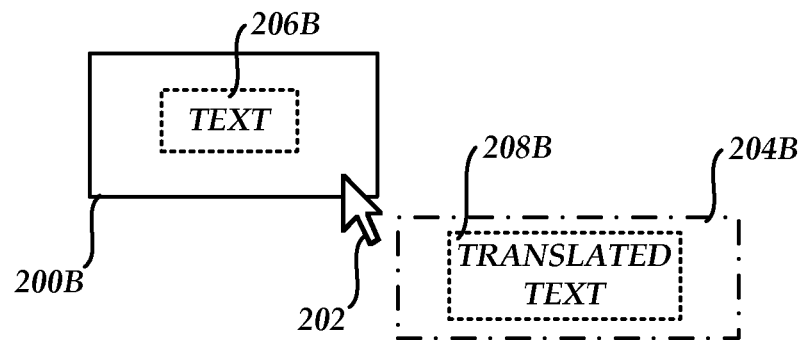

According to other aspects, the MIST module 102 is also configured to display a screentip 204B for a user interface item 200B that does not otherwise have a screentip associated therewith. This process is illustrated in FIG. 2C. In this example, the user interface item 200B has text 206B contained therein. If the MIST module 102 determines that the user interface cursor 202 is hovering over the user interface item 200B, the MIST module 102 is configured to identify translated text 208B for the text 206B in the user interface item 200B. If translated text 208B is located, the MIST module 102 is configured to display a screentip 204B having the translated text 208B contained therein. In this manner, a screentip 204B is displayed that includes translated text 208B for a user interface item 200B that would otherwise not have an associated screentip. Additional details regarding the various processes performed by the MIST module 102 according to embodiments for providing the screen displays discussed above with reference to FIGS. 2B and 2C will be provided below with reference to FIG. 3-9.

Figure 3:
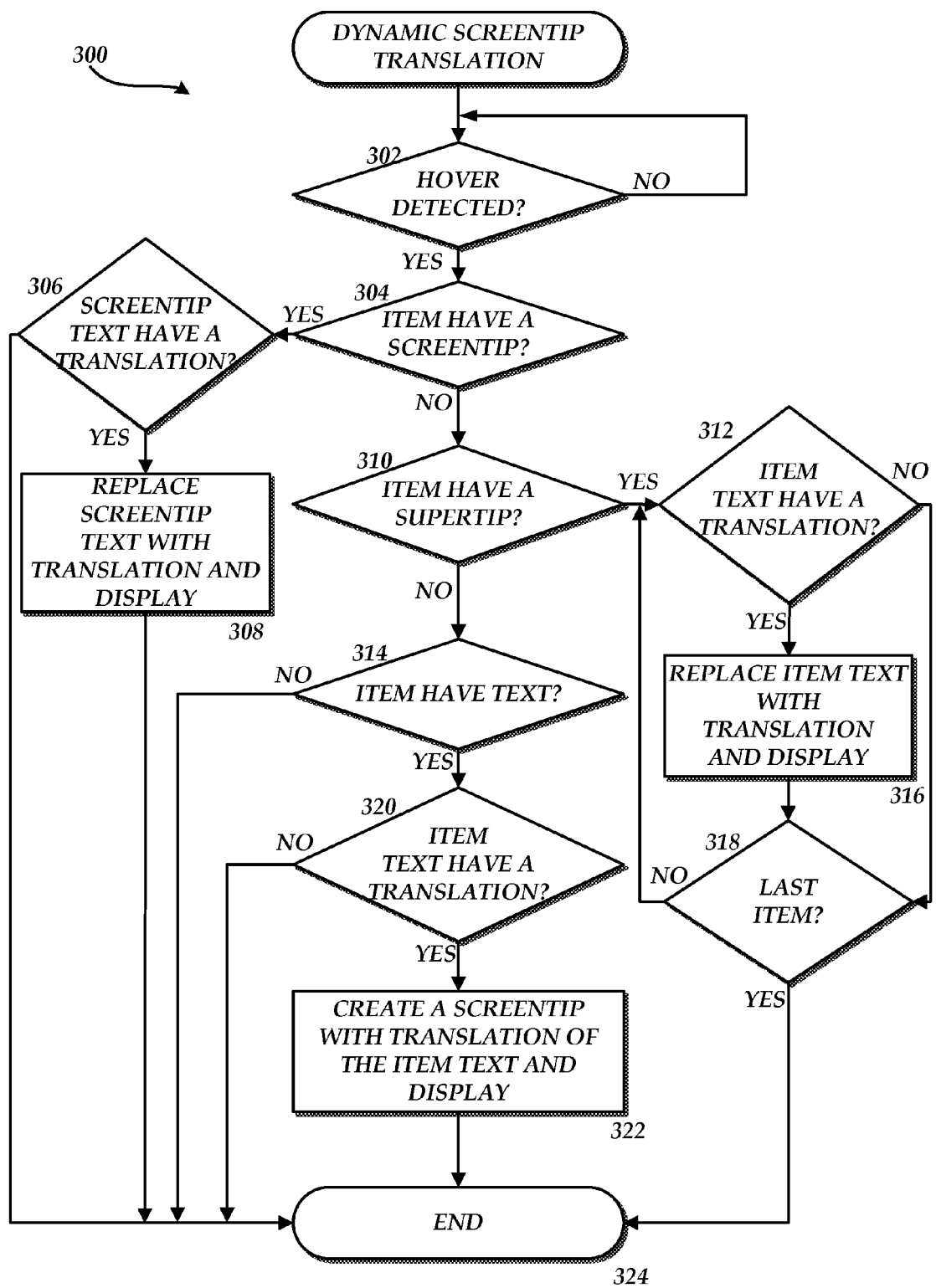
FIG. 3 is a flow diagram showing one illustrative routine for dynamic screentip language translation according to one embodiment presented herein.

FIG. 3 is a flow diagram showing a routine 300 that illustrates aspects of one process for dynamic screentip language translation. It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where a determination is made as to whether a user interface cursor 202 is hovering over a user interface item 200. If not, the routine 300 proceeds back to operation 302 where another such determination is made. As will be discussed in greater detail below, a timer may be utilized to trigger the frequency of determination as to whether a user interface cursor is hovering over a user interface item. If the user interface cursor is hovering over a user interface item then a further determination is made as to whether a translation should be performed. Additional details regarding this process will be provided below with reference to FIGS. 8-9.

If it is detected that a user interface cursor is hovering over a user interface item at operation 302, the routine 300 proceeds to operation 304 where the MIST module 102 determines whether the user interface item 200 that is being hovered over has an associated screentip 204. If the user interface item 200 has a screentip 204, the routine 300 proceeds to operation 306 where the MIST module 102 determines whether the identified screentip 204 has a corresponding translated text string (a "translation"). If the screentip 204 does have a translation, the routine 300 proceeds from operation 306 to operation 308 where the MIST module 102 replaces the text shown in the screentip 204 with the translation and displays the screentip. Details regarding the functionality performed by the MIST module 102 for determining whether a specific text string has an associated translation will be provided below with reference to FIGS. 4-5. If, at operation 306, the MIST module 102 determines that the screentip 204 does not have a translation, the routine 300 proceeds from operation 306 to operation 324, where it ends.

If, at operation 304, the MIST module 102 determines that the user interface item 200 over which the user interface cursor is hovering does not have a screentip, the routine 300 proceeds from operation 304, to operation 310. At operation 310, the MIST module 102 determines whether the user interface item 200 has an associated supertip. As discussed above, a supertip might include multiple text strings and graphics.

If the user interface item 200 has a supertip, the routine 300 proceeds from operation 310 to operation 312, where the MIST module 102 determines whether the first text item in the supertip has a translation. If so, the routine 300 proceeds to operation 316, where the MIST module 102 replaces the item text in the supertip with a translated text string and displays the translation. The routine 300 then proceeds from operation 316 to operation 318 where a determination is made as to whether the last item text in the supertip has been translated. If additional text items remain to be translated in the supertip, the routine 300 proceeds to operation 312, where the processing described above with reference to operations 312 and 316 are repeated. If no additional text items remain in the supertip to be translated, the routine 300 proceeds from operation 318 to operation 324, where it ends.

If, at operation 310, the MIST module 102 determines that the user interface item 200 does not have a supertip, the routine 300 proceeds from operation 310 to operation 314. At operation 314, the MIST module 102 determines whether the user interface item 200 contains a text string. If not, the routine 300 proceeds to operation 324, where it ends. If the user interface item 200 does have a text string, the routine 300 proceeds from operation 314 to operation 320. At operation 320, the MIST module 102 determines whether a translated text string is available that corresponds to the text string contained in the user interface item. If so, the routine 300 proceeds from operation 320 to operation 322, where the MIST module 102 creates a screentip with a translation of the text contained in the user interface item and displays the created screentip. Such a screentip is shown in FIG. 2C and described above. Details regarding one process utilized by the MIST module 102 for determining whether a text string contained within a user interface item 200 has an available translation will be described below with reference to FIG. 4-5. From operation 322, the routine 300 proceeds to operation 324, where it ends.

Figure 4:
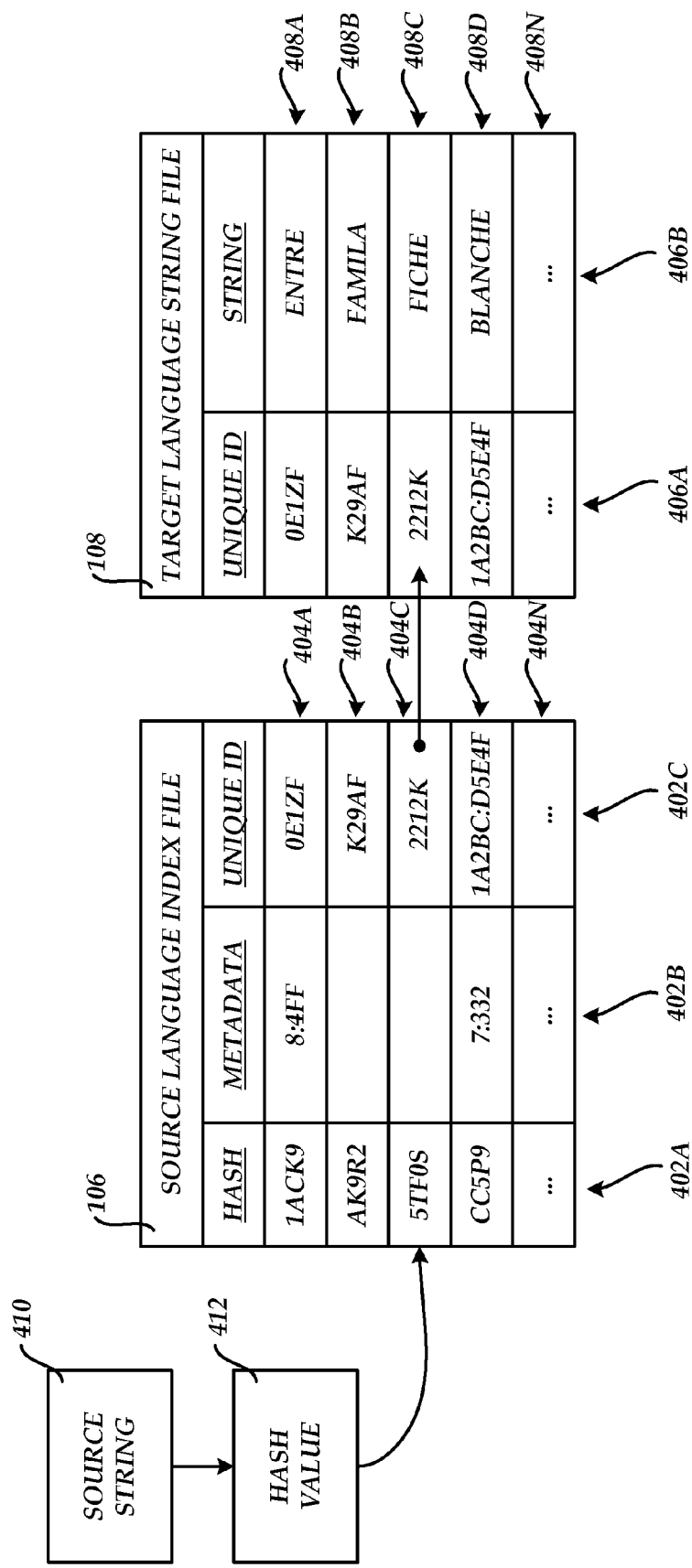
FIG. 4 is a data structure diagram showing aspects of a source language index file and a target language string file utilized in one embodiment presented herein.

Referring now to FIG. 4, additional details regarding the source language index file 106 and the target language string file 108 will be described. As shown in FIG. 4, in one embodiment, the source language index file 106 includes a number of fields 402A-402C. The field 402A is utilized for storing a hash value for each of the strings utilized by the applications 104A-104C for a given language. The hash values may be generated using conventional hashing techniques. According to embodiments, each of the hash values stored in the field 402A is associated with a unique identifier stored in the field 402C. The unique identifier stored in the field 402C is shared across equivalent strings in each language. Additional details will be provided below in this regard.

In one implementation, the unique identifiers stored in the field 402C are generated by extracting resource strings from the applications 104A-104C and assigning a unique identifier to each string. Additionally, metadata is also collected at this time indicating whether each string is part of a menu, part of a dialog, associated with a hot key, the source dynamically linked library ("DLL") from which the string was extracted, a resource identifier associated with the string, and other information. As will be discussed in greater detail below, this metadata is stored in the field 402B. The source language index file 106 and the target language string file 108 are generated with this information at build time.

As discussed briefly above, the field 402B is utilized to store metadata associated with a corresponding text string. For instance, according to one embodiment, metadata may be stored to assist in identifying a unique identifier that should be utilized to locate a translated text string when multiple unique identifiers are present for a given entry in the field 402C of the source language index file 106. As discussed above, the metadata might include, but is not limited to, data indicating whether each string is part of a menu, a dialog, or associated with a hot key, data identifying the source DLL from which a string was extracted, a resource identifier associated with the string, and other information.

As also shown in FIG. 4, the target language string file 108 includes several fields 406A-406B in one embodiment. The field 406A is utilized to store the unique identifier for a corresponding translated string. The field 406B is utilized to store the translated string itself. For instance, the entries 408A-408N in the target language string file 108 include data in the field 406B representing the actual translated text string.

As also shown in FIG. 4, and discussed briefly above, the translated text string for a source string 410 is located by first generating a hash value 412 from the source string 410. The hash value 412 is then utilized as an index into the source language index file 106. In the example shown in FIG. 4, the hash value 412 corresponds to the entry 404C in the source language index file 106. Once the proper entry has been found in the source language index file 106, the corresponding unique identifier can be located in the field 402C. The unique identifier can then be utilized by the MIST module 102 as an index into the target language string file 108. Once the appropriate entry has been located in the target language string file 108, the appropriate translated text string can be found in the field 406B. In the example shown in FIG. 4, the text string "Fiche" stored in the field 406B for the entry 408C is the translated text string for the source string 410. Additional details regarding this process are provided below with reference to FIG. 5.

It should be appreciated that the unique identifiers stored in the fields 402C and 406A are the same for all languages. In this way, the mechanisms presented herein can produce a linear number of translation mappings. For instance, it should be appreciated that using the methods presented herein, it is only necessary to map the strings in each language to the corresponding unique identifier. It is not necessary to map translations between languages (e.g. English to French, English to German, English to Dutch, French to German, etc.). This allows the use of relatively small source language index files 106 and target language string files 108, which reduces memory and disk usage. In one implementation, the unique identifier is a number from 1 to N, where N is any integer. This allows only the strings to be saved in the target language string file in one embodiment. The unique identifier can be implicitly determined based upon the order of the strings. It should be appreciated that other embodiments might utilize a non-linear number of translation mappings.

According to one implementation, the unique identifiers for the strings are grouped by location and stored together. For instance, using such an implementation, the strings for a given menu or other user interface element would stored together in the same chunk (e.g. 16 kb portion) of the source language index file 106 and target language string file 108. Because the source language index file 106 and the target language string file 108 are stored on disk, storing the strings for a particular user interface element together can significantly reduce the number of disk accesses required to retrieve the translated strings for a particular user interface element.

Figure 5:
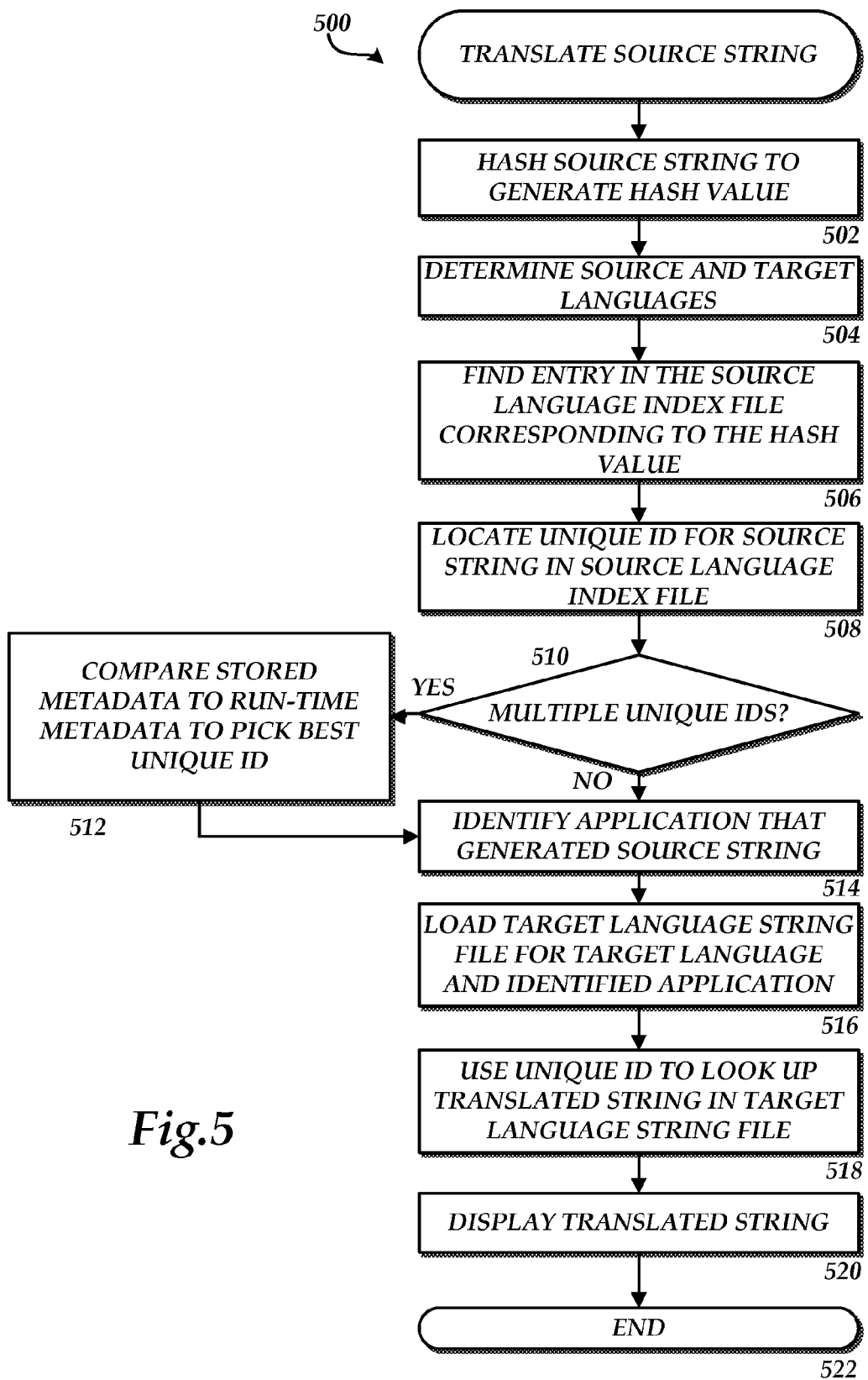
FIG. 5 is a flow diagram showing one illustrative routine for translating a source text string to a target language according to one embodiment presented herein.

Turning now to FIG. 5, an illustrative routine 500 will be described for translating a source string 410 to a translated string through the use of the source language index file 106 and the target language string file 108. The routine 500 begins at operation 502, where the MIST module 102 hashes the source string 410 to generate a hash value 412. The routine 500 then proceeds to operation 504 where the MIST module 102 determines the source and target languages for translating the source string 410. The source and target languages may be specified as a user preference through a user interface provided by the applications 104A-104C.

From operation 504, the routine 500 proceeds to operation 506 where the MIST module 102 utilizes the hash value 412 to locate the appropriate entry 404 in the source language index file 106 corresponding to the hash value 412. Once the appropriate entry 404 has been identified, the routine 500 proceeds to operation 508 where the unique identifier stored in the field 402C for the identified appropriate entry 404 is located. From operation 508, the routine 500 proceeds to operation 510.

At operation 510, the MIST module 102 determines whether multiple unique identifiers were located in the field 402C for the located appropriate entry 404. If so, the routine 500 proceeds to operation 512 where the MIST module 102 compares the metadata stored in the field 402B for the identified appropriate entry 404C to runtime metadata generated by the application to identify the particular unique identifier that should be utilized as an index into the target language string file 108. Once the unique identifier that should be utilized to index the target language string file has been identified, the routine 500 proceeds from operation 512 to operation 514.

If, at operation 510, the MIST module 102 determines that multiple unique identifiers have not been located, the routine 500 proceeds from operation 510 to operation 514. At operation 514, the MIST module 102 identifies the application 104A-104C that generated the source string 410. Once the application 104A-104C that generated the source string 410 has been identified, the routine 500 proceeds to operation 516. At operation 516, the MIST module 102 loads the target language string file 108 for the specified target language and the application 104A-104C that generated the source string 410.

From operation 516, the routine 500 proceeds to operation 518 where the unique identifier located for the source string 410 is utilized as an index into the target language string file 108. In this manner, the translated string contained in the field 406B for the identified entry 408 in the target language string file 108 can be identified. Once the translated string has been identified, the routine 500 proceeds to operation 520, where the MIST module 102 displays the translated string in the screentip 204 in the manner described above. From operation 520, the routine 500 proceeds to operation 522.

Figure 6:
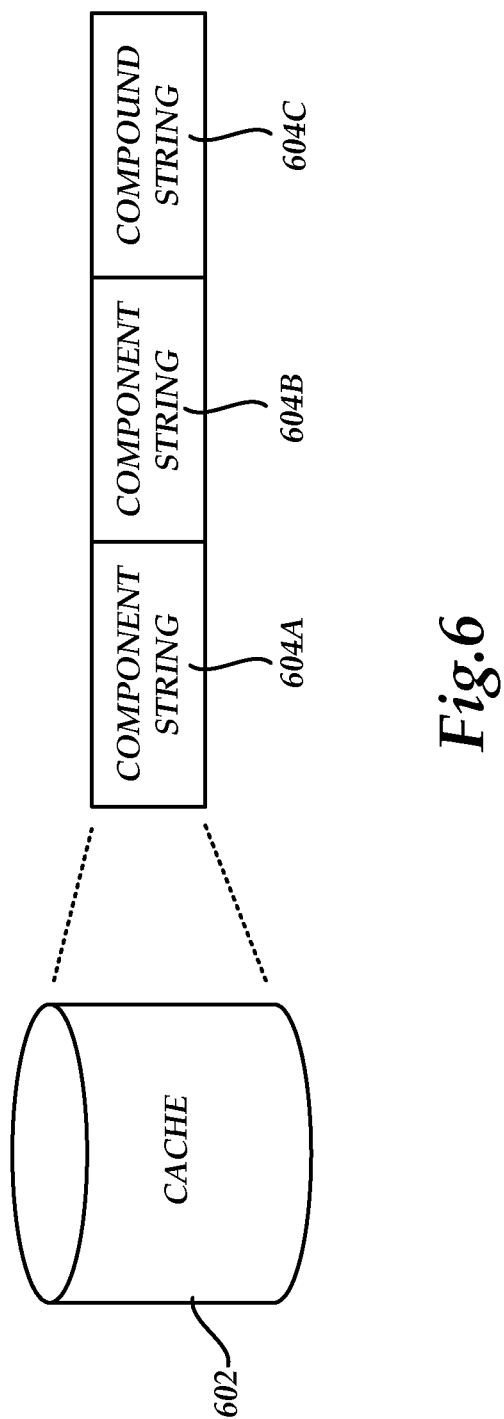
FIG. 6 is a data structure diagram showing aspects of a cache utilized in embodiments for storing data regarding the component text strings of a compound text string.
Figure 7:
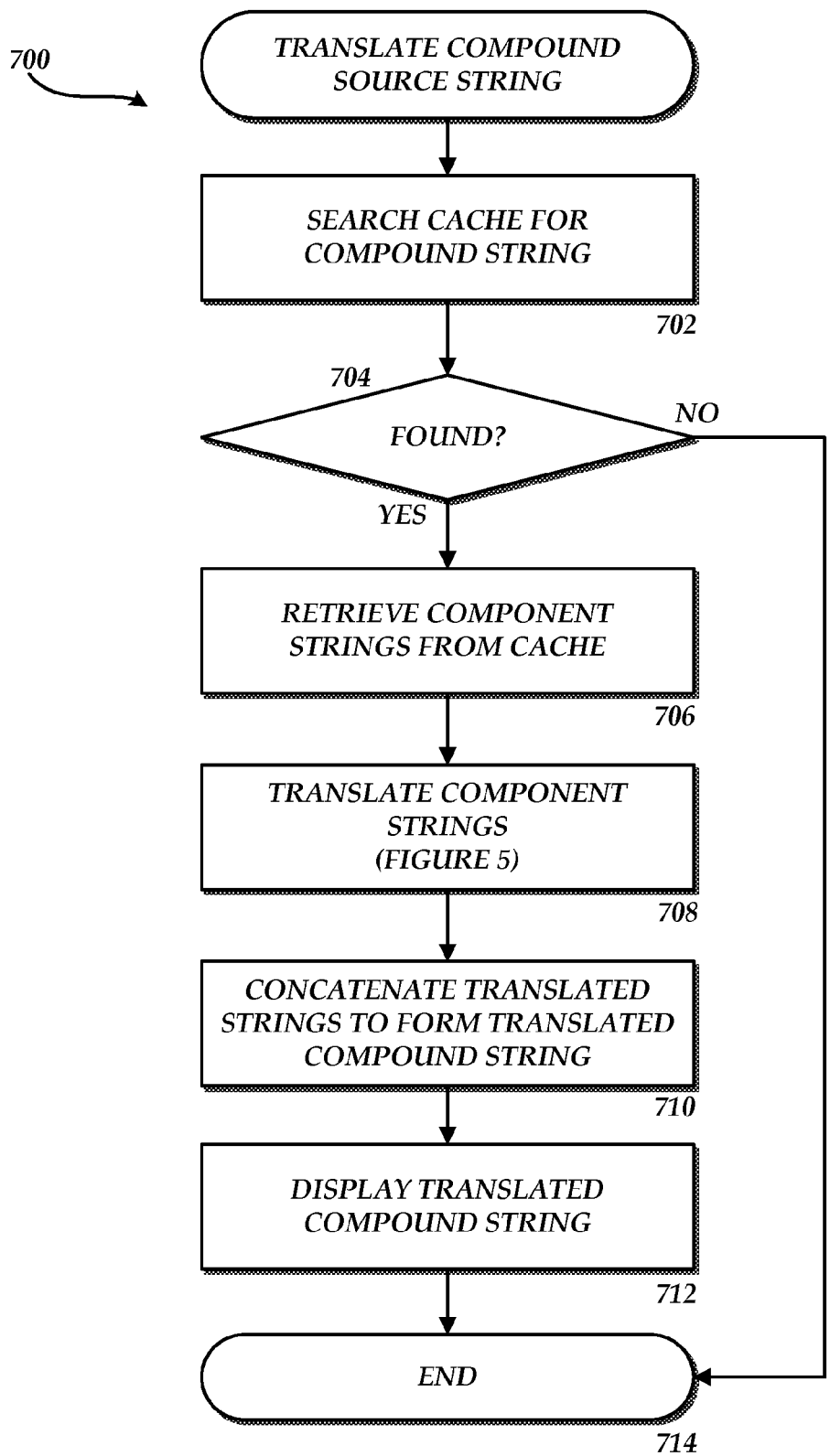
FIG. 7 is a flow diagram showing one illustrative routine for translating a compound text source string to a target language according to one embodiment presented herein.

According to some embodiments, the applications 104A-104C may store text strings containing multiple words as separate strings. At runtime, the applications 104 may concatenate the separate strings to generate a concatenated text string for display. Through this mechanism, the applications 104A-104C may save memory by storing fewer duplicated strings. Because strings formed from the concatenation of other strings and are not stored as individual strings, it may be difficult for the MIST module 102 to provide on-the-fly translations of these strings. FIGS. 6 and 7 illustrate one mechanism utilized by the MIST module 102 to address this difficulty. In particular, FIG. 6 shows the contents of a cache 602 that is generated at the time the applications 104A-104C generate text strings. As shown in FIG. 6, the contents of the cache 602 include an entry for each compound string 604C. As utilized herein, the term compound string refers to a string that is formed as the concatenation of two or more component strings.

As also shown in FIG. 6, the cache 602 stores the component strings 604A-604B for each compound string 604C. As will be discussed in greater detail below with respect to FIG. 7, the contents of the cache 602 may be utilized by the MIST module 102 at translation time in order to translate a compound string 604C.

Referring now to FIG. 7, one illustrative routine 700 performed by the MIST module 102 for translating a compound source string will be described. It should be appreciated that the routine illustrated in FIG. 7 is performed by the MIST module 102 in response to identifying a compound string for which a translation cannot otherwise be located. In this regard, the routine 700 begins at operation 702 where the MIST module 102 searches the cache 602 for the compound string to be translated. If an entry is not found in the cache 602 for the compound string to be translated, the routine 700 proceeds from operation 704 to operation 714, where it ends. If an entry is found in the cache 602 for the compound string to be translated, the routine 700 proceeds from operation 704 to operation 706. At operation 706, the component strings 604A-604B for the compound string 604C are retrieved from the cache 602. The routine 700 then proceeds to operation 708 where the MIST module 102 translates each of the component strings 604A-604B in the manner described above with reference to FIG. 5.

Once the component strings 604A-604B have been translated, the routine 700 proceeds to operation 710 where the MIST module 102 concatenates the translated strings to form a translated compound string. Once the translated compound string has been generated, the MIST module 102 displays the translated compound string in a screentip 204 in the manner described above. From operation 712, the routine 700 proceeds to operation 714, where it ends.

Figure 8:
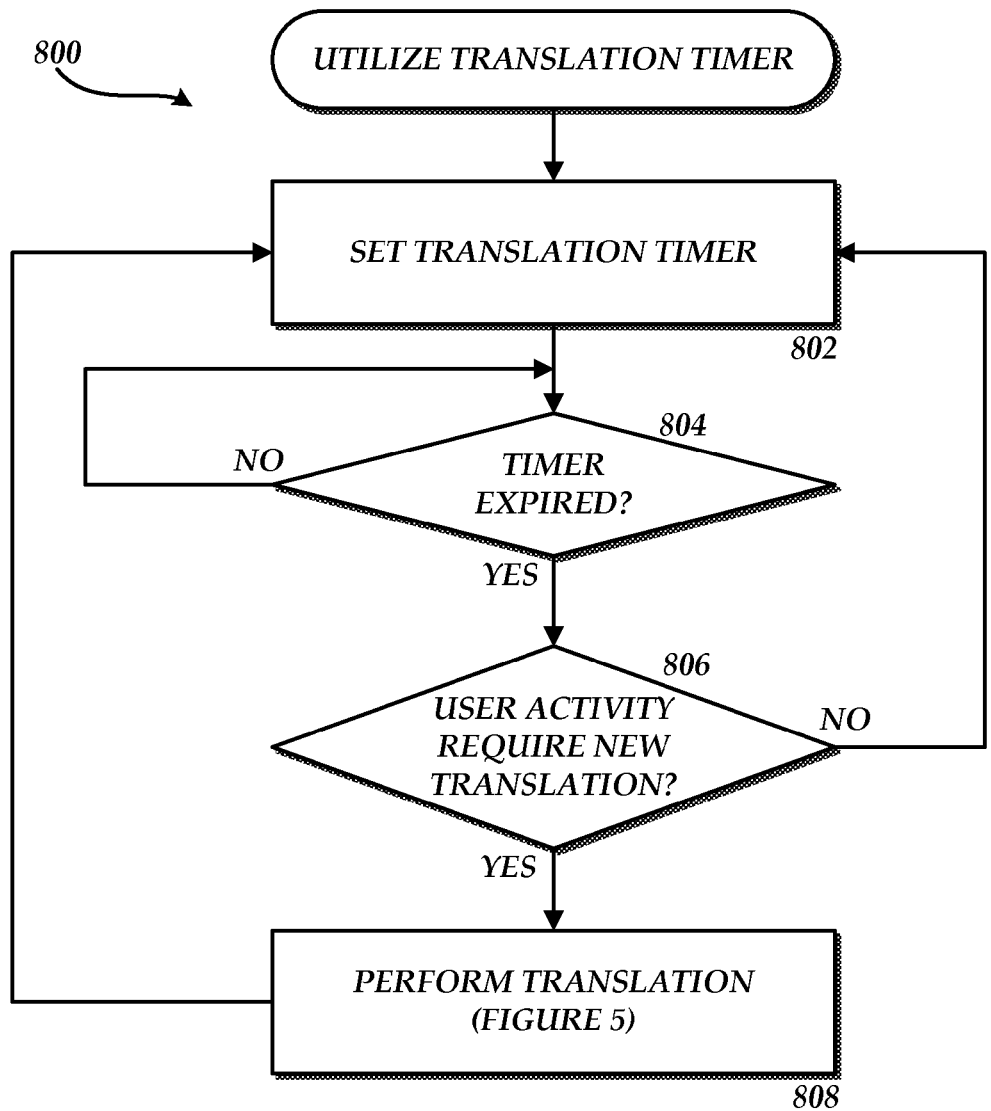
FIGS. 8-9 are flow diagrams showing illustrative routines for utilizing and managing translation timers, respectively, according to various embodiments presented herein.

As discussed briefly above, the MIST module 102 may utilize one or more timers that are utilized to initiate a determination of whether a translation is required for a particular text string. For instance, the expiration of a timer may cause the MIST module 102 to perform an inquiry as to whether the user interface cursor 202 has been moved, the current location of the user interface cursor 202, the text string that the user interface cursor 202 is hovering over, and to determine whether a new translation is needed. FIG. 8 shows an illustrative routine 800 that illustrates this process according to one implementation.

The routine 800 begins at operation 802, where the MIST module 102 sets a timer that is utilized to determine whether a translation of a text string should be performed. From operation 802, the routine 800 proceeds to operation 804 where the MIST module 102 determines whether the timer has expired. If the timer has not expired, the routine 800 proceeds back to operation 804 where another such determination is made. If the timer has expired, the routine 800 proceeds to operation 806 where the MIST module 102 determines whether a new translation is required. If no translation is required, the routine 800 proceeds once again to operation 802 where the timer is reset and the above-described operations are performed again. If the MIST module 102 determines that a new translation is required, the routine 800 proceeds from operation 806 to operation 808, where the translation is performed in the manner presented above with respect to FIG. 5. Once the translation has been performed, the routine 800 returns to operation 802 where the translation timer is reset.

Figure 9:
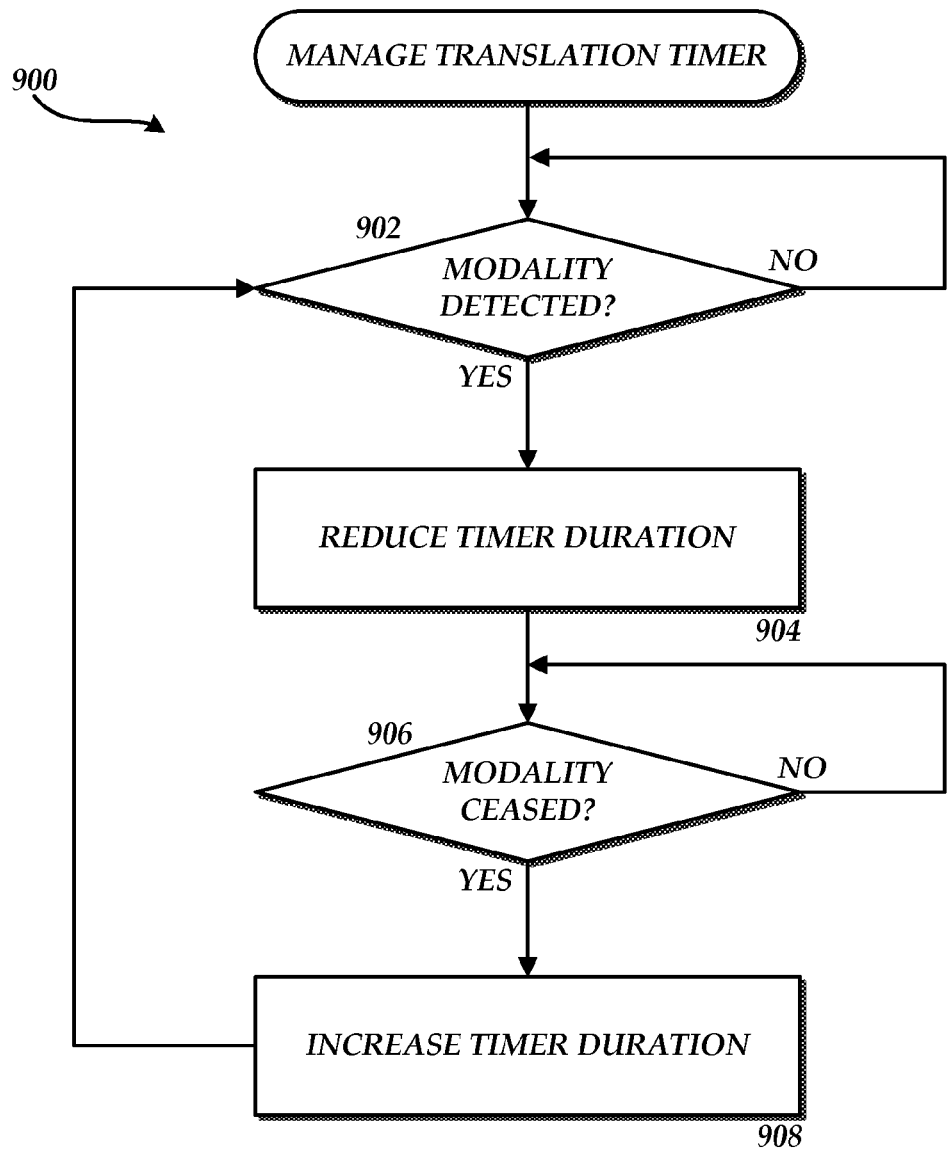

According to embodiments presented herein, the MIST module 102 is configured to modify the duration of the timer when certain circumstances are detected. For instance, in one implementation, the MIST module 102 is configured to reduce the duration of the timer when modality is detected within the application 104A-104C. Modality refers to a state of an application 104A-104C wherein a user of the application can perform no other tasks until a particular action is taken. For instance, a modal dialog box may be presented by one of the applications 104A-104C that requires the user to perform a selection within the modal dialog box. Until the selection is made, the user can take no other action within the application. One process utilized by the MIST module 102 for modifying the timer duration is illustrated in FIG. 9.

The routine 900 begins at operation 902 where the MIST module 102 determines whether modality has been detected in the application 104. If not, the routine 900 returns to operation 902 where another such determination is made. If modality is detected, the routine 900 proceeds to operation 904 where the MIST module 102 reduces the duration of the timer, therefore causing it to execute more frequently. In this manner, the timer is configured to run more often, thereby performing the translation determination described above in a more frequent fashion.

From operation 904, the routine 900 proceeds to operation 906 where the MIST module 102 determines whether the modality has ceased, such as when a user dismisses a modal dialog box. If not, the routine 900 returns to operation 906 where another such determination is made. If the modality has ceased, the routine 900 proceeds to operation 908 where the MIST module 102 increases the timer duration to its original duration. From operation 908, the routine 900 proceeds to operation 902 where the operations described above may be repeated.

Figure 10:
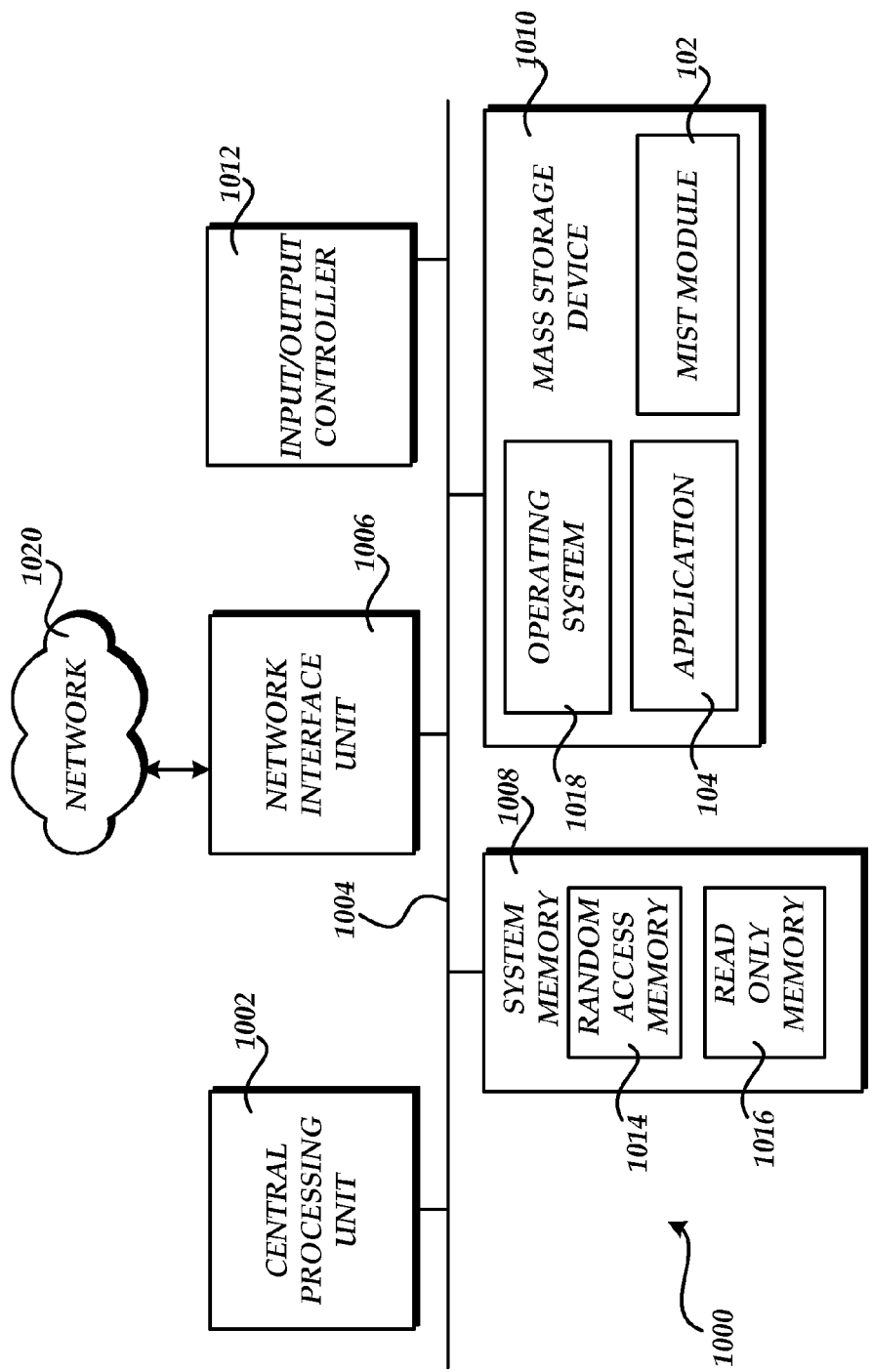
FIG. 10 is a computer architecture diagram showing an illustrative computer hardware and software architecture for a computing system capable of implementing aspects of the embodiments presented herein.

FIG. 10 shows an illustrative computer architecture for a computer 1000 capable of executing the software components described herein. The computer architecture shown in FIG. 10 illustrates a conventional desktop, laptop, or server computer and may be utilized to execute any aspects of the software components presented herein.

The computer architecture shown in FIG. 10 includes a central processing unit 1002 ("CPU"), a system memory 1008, including a random access memory 1014 ("RAM") and a read-only memory ("ROM") 1016, and a system bus 1004 that couples the memory to the CPU 1002. A basic input/output system containing the basic routines that help to transfer information between elements within the computer 1000, such as during startup, is stored in the ROM 1016. The computer 1000 further includes a mass storage device 1010 for storing an operating system 1018, application programs, and other program modules, which are described in greater detail herein.

The mass storage device 1010 is connected to the CPU 1002 through a mass storage controller (not shown) connected to the bus 1004. The mass storage device 1010 and its associated computer readable storage media provide nonvolatile storage for the computer 1000. Although the description of computer readable storage media contained herein refers to a mass storage device, such as a hard disk or CD-ROM drive, it should be appreciated by those skilled in the art that computer storage media can be any available computer storage media that can be accessed by the computer 1000.

By way of example, and not limitation, computer readable storage media may include volatile and non-volatile, removable and non-removable media implemented in any method or technology for storage of information such as computer readable and executable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1000.

According to various embodiments, the computer 1000 may operate in a networked environment using logical connections to remote computers through a network such as the network 1020. The computer 1000 may connect to the network 1020 through a network interface unit 1006 connected to the bus 1004. It should be appreciated that the network interface unit 1006 may also be utilized to connect to other types of networks and remote computer systems. The computer 1000 may also include an input/output controller 1012 for receiving and processing input from a number of other devices, including a keyboard, mouse, or electronic stylus (not shown in FIG. 10). Similarly, an input/output controller may provide output to a display screen, a printer, or other type of output device (also not shown in FIG. 10).

As mentioned briefly above, a number of program modules and data files may be stored in the mass storage device 1010 and RAM 1014 of the computer 1000, including an operating system 1018 suitable for controlling the operation of a networked desktop, laptop, or server computer. The mass storage device 1010 and RAM 1014 may also store one or more program modules. In particular, the mass storage device 1010 and the RAM 1014 may store the application 104 and the MIST module 102, each of which was described above in detail. The mass storage device 1010 and the RAM 1014 may also store other types of program modules and data.

It should be appreciated that the software components described herein may, when loaded into the CPU 1002 and executed, transform the CPU 1002 and the overall computer 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules and data presented herein might also transform the physical structure of the computer storage media presented herein. The specific transformation of physical structure may depend on various factors, in different implementations of this description. Examples of such factors may include, but are not limited to: the technology used to implement the computer storage media, whether the computer storage media is characterized as primary or secondary storage, and the like. For example, if the computer storage media is implemented as semiconductor-based memory, the software disclosed herein may be encoded on the computer readable storage media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the computer 1000 may comprise other types of computing devices, including hand-held computers, embedded computer systems, personal digital assistants, and other types of computing devices known to those skilled in the art. It is also contemplated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for dynamic screentip language translation have been disclosed herein. Although the subject matter presented herein has been described in language specific to computer structural features, methodological and transformative acts, specific computing machinery, and computer storage media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
    detecting, by a computing device, a user interface cursor hovering over a user interface item;
    in response to detecting the user interface cursor hovering over the user interface item, determining, by the computing device, whether the user interface item has an associated screentip comprising a text string in a first language;
    if the user interface item has an associated screentip, determining, by the computing device, whether the associated screentip has a translated text string corresponding to the text string, the translated text string comprising the text string translated from the first language into a second language;
    if the associated screentip has a translated text string, replacing, by the computing device, the text string in the associated screentip with the translated text string and displaying the translated text string in the associated screentip;
    if the user interface item does not have an associated screentip, determining, by the computing device, whether the user interface item contains a text string;
    if the user interface item contains a text string, determining, by the computing device, whether a translated text string is available that corresponds to the text string contained in the user interface item, the translated text string comprising the text string translated from a first language into a second language; and
    if a translated text string is available that corresponds to the text string contained in the user interface item, creating, by the computing device, a screentip containing the translated text string and displaying the screentip for the user interface item.

2. The computer-implemented method of claim 1, wherein the associated screentip further comprises a graphic.

3. The computer-implemented method of claim 1, wherein:
    the first language is a language selected from a group of languages comprising English, Spanish, Chinese, Hindi, Arabic, Portuguese, Bengali, Russian, Japanese, French, and German; and
    the second language is a different language selected from the group of languages comprising English, Spanish, Chinese, Hindi, Arabic, Portuguese, Bengali, Russian, Japanese, French, and German.

4. The computer-implemented method of claim 1, wherein the first language is English and the second language is a language different from English.

5. The computer-implemented method of claim 1, wherein the second language is English and the first language is a language different from English.

6. The computer-implemented method of claim 1, further comprising detecting, by the computing device, the user interface cursor no longer hovering over the user interface item, and in response to detecting the user interface no longer hovering over the user interface item, ceasing to display the associated screentip or the screentip, as applicable.

7. The computer-implemented method of claim 1, further comprising utilizing a timer to trigger a frequency of determination as to whether the user interface cursor is hovering over the user interface item.

8. A computer-readable storage medium having computer-executable instructions stored thereupon which, when executed by a computer, cause the computer to:
    detect a user interface cursor hovering over a user interface item;
    in response to detecting the user interface cursor hovering over the user interface item, determine whether the user interface item has an associated screentip comprising a text string in a first language;
    if the user interface item has an associated screentip, determine whether the associated screentip has a translated text string corresponding to the text string, the translated text string comprising the text string translated from the first language into a second language;
    if the associated screentip has a translated text string, replace the text string in the associated screentip with the translated text string and displaying the translated text string in the associated screentip;

if the user interface item does not have an associated screentip, determine whether the user interface item contains a text string;

if the user interface item contains a text string, determine whether a translated text string is available that corresponds to the text string contained in the user interface item, the translated text string comprising the text string translated from a first language into a second language; and if a translated text string is available that corresponds to the text string contained in the user interface item, create a screentip containing the translated text string and displaying the screentip for the user interface item.

9. The computer-readable storage medium of claim 8, wherein the associated screentip further comprises a graphic.

10. The computer-readable storage medium of claim 8, wherein:

the first language is a language selected from a group of languages comprising English, Spanish, Chinese, Hindi, Arabic, Portuguese, Bengali, Russian, Japanese, French, and German; and the second language is a different language selected from the group of languages comprising English, Spanish, Chinese, Hindi, Arabic, Portuguese, Bengali, Russian, Japanese, French, and German.

11. The computer-readable storage medium of claim 8, wherein the first language is English and the second language is a language different from English.

12. The computer-readable storage medium of claim 8, wherein the second language is English and the first language is a language different from English.

13. The computer-readable storage medium of claim 8, having further computer-executable instructions stored thereupon which, when executed by the computer, cause the computer to detect the user interface cursor no longer hovering over the user interface item, and in response to detecting the user interface no longer hovering over the user interface item, cease to display the associated screentip or the screentip, as applicable.

14. The computer-readable storage medium of claim 8, having further computer-executable instructions stored thereupon which, when executed by the computer, cause the computer to utilize a timer to trigger a frequency of determination as to whether the user interface cursor is hovering over the user interface item.

15. A computer system comprising:

a processor; and a memory in communication with the processor, the memory comprising computer-executable instructions which, when executed by the processor, cause the processor to detect a user interface cursor hovering over a user interface item;

in response to detecting the user interface cursor hovering over the user interface item, determine whether the user interface item has an associated screentip comprising a text string in a first language;

if the user interface item has an associated screentip, determine whether the associated screentip has a translated text string corresponding to the text string, the translated text string comprising the text string translated from the first language into a second language;

if the associated screentip has a translated text string, replace the text string in the associated screentip with the translated text string and displaying the translated text string in the associated screentip;

if the user interface item does not have an associated screentip, determine whether the user interface item contains a text string;

if the user interface item contains a text string, determine whether a translated text string is available that corresponds to the text string contained in the user interface item, the translated text string comprising the text string translated from a first language into a second language; and if a translated text string is available that corresponds to the text string contained in the user interface item, create a screentip containing the translated text string and displaying the screentip for the user interface item.

16. The computer system of claim 15, wherein the associated screentip further comprises a graphic.

17. The computer system of claim 15, wherein:

the first language is a language selected from a group of languages comprising English, Spanish, Chinese, Hindi, Arabic, Portuguese, Bengali, Russian, Japanese, French, and German; and the second language is a different language selected from the group of languages comprising English, Spanish, Chinese, Hindi, Arabic, Portuguese, Bengali, Russian, Japanese, French, and German.

18. The computer system of claim 15, wherein the first language is English and the second language is a language different from English.

19. The computer system of claim 15, wherein the second language is English and the first language is a language different from English.

20. The computer system of claim 13, wherein the memory further comprises computer-executable instructions which, when executed by the processor, cause the computer to detect the user interface cursor no longer hovering over the user interface item, and in response to detecting the user interface no longer hovering over the user interface item, cease to display the associated screentip or the screentip, as applicable.

* * * * *